Nov. 29, 1960 H. HENISCH 2,962,595
PHOTOCONDUCTIVE CELLS
Filed Feb. 21, 1956
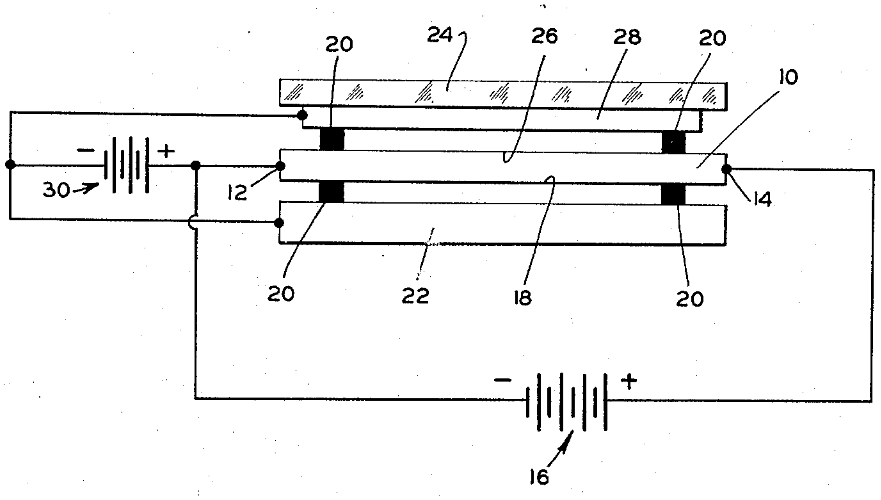
INVENTOR
HEINZ K. HENISCH
BY Theodore C. Jay Jr.
ATTORNEY United States Patent Office 2,962,595
Patented Nov. 29, 1960

2,962,595

PHOTOCONDUCTIVE CELLS

Heinz Henisch, Flushing, N.Y., assignor, by mesne assignments, to Sylvania Electric Products Inc., Wilmington, Del., a corporation of Delaware Filed Feb. 21, 1956, Ser. No. 566,816
6 Claims. (Cl. 250—211)

My invention is directed toward photoconductive cells of high sensitivity.

Certain types of semiconductors, known as photoconductors, when mounted in a supporting structure to form a photoconductive cell connected between two points of different electric potential and exposed to incident radiation, will exhibit what is known to the art as a photoconductance effect. More specifically, when there is no incident radiation, and the potential difference across the cell is adjusted to a predetermined value, a given current, known as the dark current, will flow through the cell. When a surface of the cell is illuminated by incident radiation to which the semiconductor material is opaque, the current flow will increase, the percentage increase being a function of the intensity of the radiation. For any given cell, the ratio of the change in current flow to the change in intensity of the incident radiation is termed the photoelectric sensitivity.

When a photoconductor is so illuminated, additional charged carriers are produced in the material, and these additional carriers are responsible for the increase in current flow. These additional carriers are continually recombining with oppositely charged carriers in the photoconductor, at which point they have no further effect on current flow. The interval between the instant an additional carrier is generated and the instant it recombines (evaluated by a quantity known as the carrier lifetime), therefore effects the photoelectric sensitivity. Stated differently, if the rate of additional carrier generation is held fixed by holding the radiation intensity and frequency constant, as the lifetime is increased, the steady state concentration of the additional carriers is increased, and the current flow likewise increases. Thus, for any photoconductive cell, the photoelectric sensitivity is dependent upon the carrier lifetime.

The carrier lifetime in general depends upon two processes: the rate of carrier recombination in the interior of the photoconductor body (bulk recombination) and the rate of carrier recombination at the surface or surfaces thereof (surface recombination). Bulk recombination depends upon the intrinsic structure of the photoconductor and cannot be influenced by external means. The surface recombination depends both upon the structure of the photoconductor and its surface treatment and can be influenced by external means. When, for example, the photoconductor body is relatively thin, or the bulk lifetime of the material is high, the surface recombination effect can predominate.

I have discovered, that by suitably modifying the rate of carrier recombination at the surface or surfaces of a photoconductor body, and thereby increasing its carrier lifetime, I am able to increase the photoelectric sensitivity of a photocell over the sensitivity hitherto obtainable.

Accordingly, it is an object of the present invention to increase the photoelectric sensitivity of a photoconductive cell.

It is another object of the present invention to provide a new and improved photoconductive cell.

Still another object is to increase the sensitivity of a photoconductor body by suppressing carrier recombination at one or more selected surfaces of said body.

Yet a further object is to provide a new and improved photoconductor body characterized by a photoelectric sensitivity greatly in excess of that conventionally obtainable.

These and other objects of my invention will either be explained or will become apparent hereinafter.

In my invention there is provided a photoconductor body provided with at least one external surface. At least one electrically conductive member extends over at least a portion of this surface and is insulated therefrom. I further provide means coupled between said body and said member to establish an electrostatic field between said member and said surface portion. This field, depending upon its intensity (and if a constant field also upon its polarity), will also control the rate of surface recombination.

In order to increase the photoelectric sensitivity of a photocell, the field must act to suppress, wholly or in part, surface recombination at said surface portion. Alternatively the field can be used to accentuate surface recombination. Therefore, in a more general sense, my invention can be used to control surface recombination so as to increase or decrease its effect.

As a result, when the field is used to suppress surface recombination in a photoconductive cell operatively connected in an electric circuit, the carrier lifetime and hence the photoelectric sensitivity of the cell can be sharply increased over that obtainable in the absence of the electrostatic field.

My invention will now be described in more detail with reference to the accompanying figure which illustrates a selected embodiment of my invention.

Referring now to the figure, there is provided a thin elongated photoconductor body 10 formed for example of a single conductivity type (such as P or N type) germanium, silicon, or other known photoconductive materials. Opposite ends 12 and 14 of this body are connected to oppositely poled terminals of a battery 16; in this example, end 12 is connected to the negative terminal and end 14 is connected to the positive terminal. The bottom surface 18 of body 10 is secured through insulated spacers 20 to an electrically conductive base plate 22. Plate 22 can, for example, be formed from silver, copper, or other highly conductive metal or alloy.

A glass plate 24 is positioned over the top surface 26 of body 10. Interposed between the glass and the top surface is an optically transparent electrically conductive layer 28 formed, for example, of an electrically conductive glass or other similar materials. Layer 28 is insulated from the top surface of the body by means of insulating spacers 20. Plate 22 and layer 28 are connected in parallel to the negative terminal of a battery 30, the positive terminal of battery 30 being connected to end 12 of the photoconductor body. The body itself is opaque to incident radiation to which the glasses are transparent.

When incident radiation of this type illuminates the top surfaces of the photoconductor body, an increased current flows between ends 12 and 14 of the photoconductor body. The action of battery 30 establishes a constant electrostatic field between each of the plates and the photoconductor body, which has a direction and an intensity at which carrier recombination at the top and bottom surfaces is suppressed partially or wholly. As a result, the current flowing through the body is sharply increased over that obtainable in the absence of battery 30 and the two metal plates.

It is not necessary to use both plates. However, when one plate is eliminated, recombination at the surface of the conductor body which is remote from the remaining plate will not be suppressed, and therefore the increase in photoconductive sensitivity will not be as accentuated. A maximum increase in sensitivity is obtained by positioning a metal plate adjacent each exposed surface of the photoconductor body and thereby suppressing carrier recombination thereat.

In the figure, the metal plates are charged positively with respect to the photoconductor body. However, for reasons not well understood, such is not always the case, and these relative polarities can be reversed; the polarities required depend not only upon the type of photoconductor material, but also upon the photoconductor surface treatment.

While I have shown and pointed out my invention as applied above, it will be apparent to those skilled in the art that many modifications can be made within the scope and sphere of my invention as defined in the claims which follow.

What is claimed is:

1. Apparatus comprising a photoconductor body formed of a single type of photoconductive material exhibiting uniform electrical conductivity, said body having a selected exterior surface; at least one electrically conductive member insulatedly separated from said surface and extending over at least a portion thereof; and means coupled between said member and said body to establish an electrostatic field therebetween, said field having a polarity and an intensity at which the rate of carrier surface recombination at said portion of said surface is substantially reduced as compared to the rate established in the absence of said field.

2. Apparatus comprising a photoconductor body formed of a single type of photoconductive material exhibiting uniform electrical conductivity, said body having a selected exterior surface; at least one electrically conductive member insulatedly separated from said surface and extending over at least a portion thereof; means coupled between said member and said body to establish an electrostatic field therebetween, said field having a polarity and an intensity at which the rate of carrier surface recombination at said portion of said surface is substantially reduced as compared to the rate established in the absence of said field; and means for applying a voltage between the ends of said body.

3. Apparatus comprising a photoconductor body formed of a single type of photoconductive material exhibiting uniform electrical conductivity, said body having a plurality of exterior surfaces; a like plurality of electrically conductive members which are electrically connected in parallel with each other, each member extending over its corresponding surface and being insulated therefrom; and means coupled between said members and said body to establish an electrostatic field between each member and the corresponding surface, said field having a direction and an intensity at which carrier surface recombination at said corresponding surface is suppressed.

4. Apparatus comprising a photoconductor body formed of a single type of photoconductive material exhibiting uniform electrical conductivity, said body having a selected exterior surface; and an electrically conductive member insulated from said surface and extending over at least a portion thereof; and means between said member and said body to establish an electrostatic field therebetween, said field having a direction and an intensity at which the carrier lifetime of charged carriers produced in said body when under the influence of incident radiation to which said body is opaque is increased as compared to the lifetime of said carriers in the absence of said field.

5. Apparatus comprising a photoconductor body formed of a single type of photoconductive material exhibiting uniform electrical conductivity, said body having a selected exterior surface; an electrically conductive member electrically insulated from said surface and extending over at least a portion thereof; and means coupled between said body and said member to establish an electrostatic field therebetween to control said rate of recombination, said field having a constant intensity, the effect of said field increasing as the intensity increases, said field when having a selected polarity acting to decrease the recombination rate and when having an opposite polarity acting to increase the recombination rate.

6. Apparatus comprising a photoconductor body formed of a single type of photoconductive material exhibiting uniform electrical conductivity, said body having first and second opposite external surfaces and first and second opposite external ends intersecting said surfaces; first and second electrically conductive members located adjacent said first and second surfaces respectively, said members being electrically interconnected; electrical insulating means interposed between said conductive members and the first and second surfaces of said photoconductor body; and means for applying a voltage across the first and second ends of said photoconductor body.

References Cited in the file of this patent

UNITED STATES PATENTS

| | | |
|---|---|---|
| 2,277,101 | Heimann | Mar. 24, 1942 |
| 2,362,473 | Dunham | Nov. 14, 1944 |
| 2,524,033 | Bardeen | Oct. 3, 1950 |
| 2,768,265 | Jenness | Oct. 23, 1956 |
| 2,768,310 | Kazan | Oct. 23, 1956 |
| 2,791,759 | Brown | May 7, 1957 |
| 2,791,761 | Morton | May 7, 1957 |
| 2,792,752 | Moncrieff-Yeates et al. | May 21, 1957 |
| 2,794,863 | Van Roosbroeck | June 4, 1957 |
| 2,837,660 | Orthuber et al. | June 3, 1958 |

FOREIGN PATENTS

| | | |
|---|---|---|
| 304,132 | Great Britain | June 11, 1930 |